United States Patent [19]

Tarrant

[11] Patent Number: 5,226,757
[45] Date of Patent: Jul. 13, 1993

[54] YARD WASTE COLLECTION VEHICLE

[76] Inventor: John W. Tarrant, P.O. Box 358, Saratoga Springs, N.Y. 12866

[21] Appl. No.: 971,354

[22] Filed: Nov. 4, 1992

[51] Int. Cl.5 .......................... B60P 1/04; B60P 1/60; B60P 1/00; B65F 3/16
[52] U.S. Cl. ..................................... 406/39; 414/409; 241/101.7; 241/DIG. 38; 15/340.1; 15/347
[58] Field of Search ........................ 406/39–41, 406/51, 73, 74, 99–101, 96, 157, 159; 414/406, 409; 298/22 R, 8 R, 8 H; 198/307.1, 701, 750; 15/340.1, 347; 241/101.7, 58, DIG. 38

[56] References Cited

U.S. PATENT DOCUMENTS

| | | | |
|---|---|---|---|
| 1,708,176 | 4/1929 | Holly | 406/40 |
| 2,116,603 | 5/1938 | Holly | 406/130 X |
| 2,878,508 | 3/1959 | Sedgwick et al. | 15/340.1 X |
| 2,981,485 | 4/1961 | Mainone . | |
| 3,174,636 | 3/1965 | Dempster et al. | 414/409 |
| 3,211,312 | 10/1965 | Miller | 298/8 R X |
| 3,927,780 | 12/1975 | Dearlove . | |
| 3,995,754 | 12/1976 | De Koning . | |
| 4,016,994 | 4/1977 | Wurster | 406/39 |
| 4,200,950 | 5/1980 | Coverly | 406/39 X |
| 4,601,631 | 7/1986 | Van Raaij . | |
| 4,840,531 | 6/1989 | Dineen | 414/409 |
| 4,884,937 | 12/1989 | Braunius . | |
| 5,035,563 | 7/1991 | Mezey | 414/409 |

FOREIGN PATENT DOCUMENTS

| | | | |
|---|---|---|---|
| 1264702 | 1/1990 | Canada . | |
| 526094 | 6/1931 | Fed. Rep. of Germany | 15/347 |
| 3510700 | 9/1986 | Fed. Rep. of Germany | 414/501 |
| 1558734 | 4/1990 | U.S.S.R. | 406/41 |

OTHER PUBLICATIONS

PRD 3000, A new era in curbside separated recyclable collection, Frink; Aug. 1990, brochure.
Eager Beaver, Model R-31, Automated Recycler, General Engines Co., Inc., Aug. 1990, brochure.

Primary Examiner—David M. Mitchell
Assistant Examiner—James M. Kannofsky
Attorney, Agent, or Firm—Schmeiser, Morelle & Watts

[57] ABSTRACT

The invention is a yard waste removal vehicle capable of being used to collect various types of yard waste. The vehicle includes a box-like hopper that is adapted to receive materials from a conveyer system, vacuum system, a side access door and a towed chipper machine. The interior of the hopper includes a movable partition that enables a segregation of the hopper's contents with a concomitant ability to separately dump the contents of each portion of the divided hopper.

23 Claims, 3 Drawing Sheets

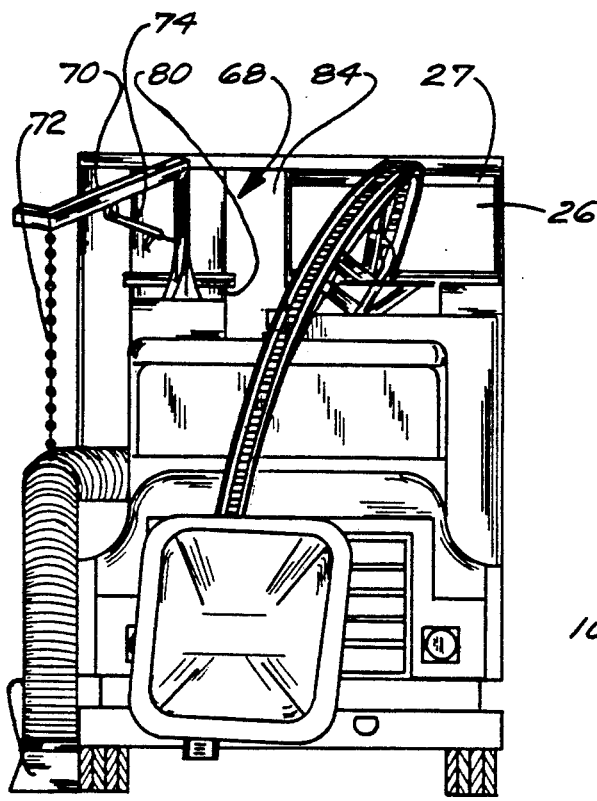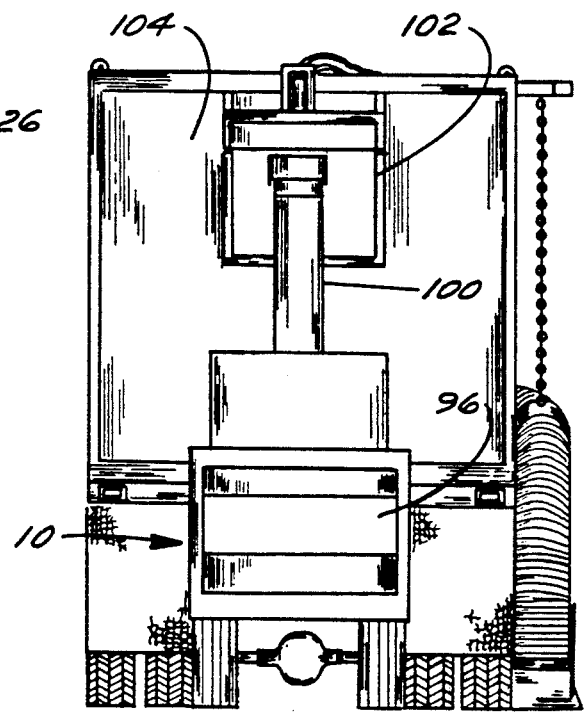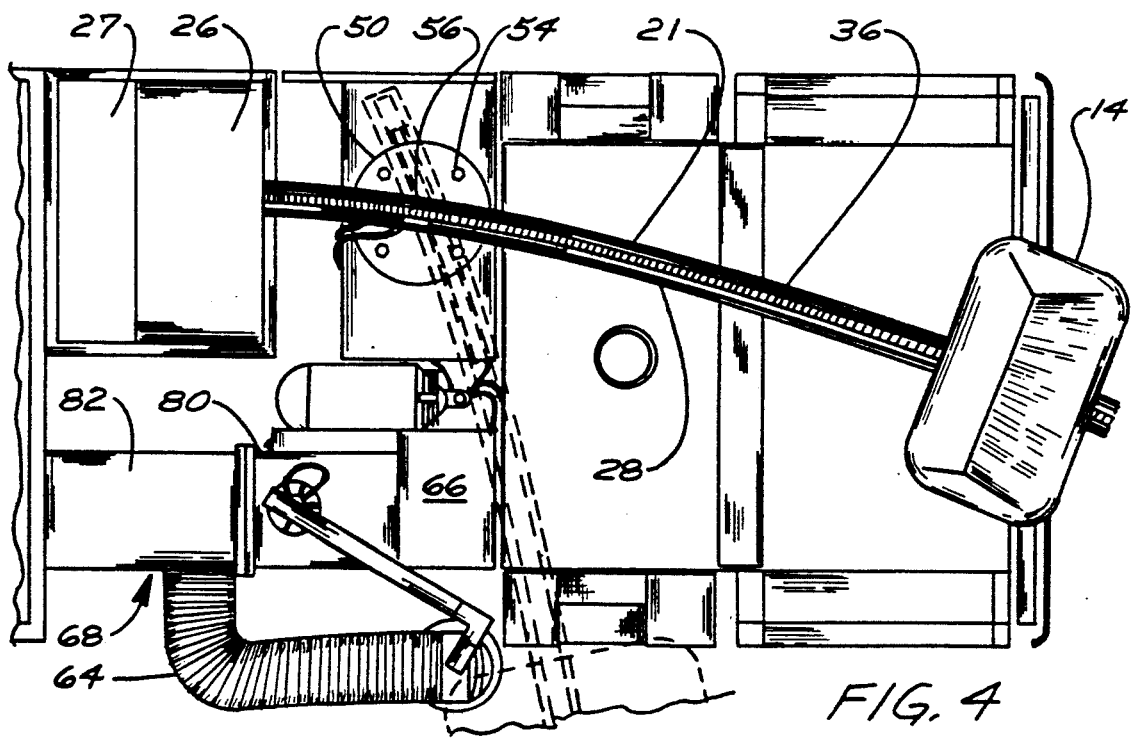

YARD WASTE COLLECTION VEHICLE

FIELD OF THE INVENTION

The invention is in the field of waste collection vehicles. More particularly, the invention is a vehicle specially adapted for the collection and segregated transport of yard wastes such as leaves, branches, grass clippings and other organic refuse.

BACKGROUND OF THE INVENTION

Many communities have become concerned about the volume of waste material that they collect and the methods used for its disposal. As a result, more attention is being directed toward alternative methods of waste disposal that do not pollute the environment while reducing the amount of material that must be burned, dumped or buried at landfills.

One method of waste disposal frequently touted is the composting of organic wastes. In this method, organic materials are collected and then placed into piles where they decompose into an organic end product material that can be used as a fertilizer.

As a first step in starting a composting program, many communities are investigating the feasibility of composting the yard wastes that are normally collected. Examples of this type of waste material are leaves, grass clippings and branches. These materials are often collected along with regular trash and are brought to landfills where they are buried and occupy valuable landfill space.

To compost these materials, one must collect them separately from the non-compostable trash. Once collected, the yard waste must be transported to an area where it can be further processed, if required, and then put into compost piles.

While composting is a simple and inexpensive process, there are significant problems involved in the collection, transport and processing of the raw yard waste materials. Firstly, many different types of removal equipment are required to pick up the different forms of yard waste. For example, standard refuse trucks are normally used to collect bagged yard waste. On the other hand, branches are often collected by throwing them into a chipper machine that is towed by a dump truck which receives the discharged wood chips. Piles of leaves are usually collected using a truck that vacuums the leaves from the ground and deposits them into an enclosed hopper. For thick branches, a standard dump truck is often used with the sanitation personnel manually lifting the limbs onto the truck.

A second problem experienced with the collection and transport of yard waste is that an excessive amount of time is required to collect the different forms of yard waste. This occurs when different crews must be sent to the same collection site. This wasted time increases costs and also makes the collection process more complex to schedule.

Thirdly, some processing of the collected wastes may be required before they are in an optimum form for composting. For example, large logs and branches must be cut into wood chips to reduce the time required for their decomposition. Leaves should also be reduced in size so that when they are put into the compost piles, they can break down at an accelerated rate. This processing requires that the different materials be initially sorted so that they can be handled by the proper cutting machine.

As one can see from the above, a composting program that makes use of a number of different types of yard waste must overcome significant problems in the collection, transport and handling/processing of the waste materials. The above noted problems all adversely affect the economic feasibility of starting a composting program.

SUMMARY OF THE INVENTION

The invention is a yard waste collection vehicle that enables the collection and transport of a number of different types of yard waste using the same vehicle. The vehicle includes a large, fully-enclosed hopper mounted onto a truck chassis. The vehicle further includes a conveyer system, side access door, vacuum system and a rear access door through which a towed chipper may input wood chips.

The hopper includes a movable interior panel that when in a vertical, first position, divides the hopper into two separate compartments. When the panel is moved to its second position, the forward compartment is no longer fully separated from the rearward compartment.

The rearward end of the hopper is in the form of a door that is hingedly connected to the top of the hopper and which can be opened to allow dumping of the hopper's contents. When the hopper is dumped and the interior panel is in its first position, only the contents of the hopper's rearward compartment are dumped. The truck can then be moved to another location where the partition is placed in its second position and the contents of the hopper's forward compartment may then be dumped out from the hopper's rear door. In this manner, it is possible to separately dump the contents from each of the hopper's two interior compartments.

The vehicle's conveyer system is in the form of an arcuately-shaped track upon which a wheeled cart is movably secured. The cart is in the form of a large open-topped bucket similar in size and shape to the bucket of a wheelbarrow. When located at the bottom of the track, the cart is near the ground in a position where it can be easily filled with bagged or small-sized yard waste. When the cart is moved to the top of the track, it dumps its contents into the hopper. The conveyer system is also adapted for pivotal movement so that it can be repositioned to enable access to the vehicle's engine compartment.

The front compartment of the hopper includes a side access door through which thick branches or other large or odd-sized materials can be manually placed within the hopper's front compartment. The door preferably includes a hydraulic lift apparatus to facilitate opening or closing of the door.

Located between the forward end of the hopper and the cab is a leaf vacuum system that incorporates a diesel-powered blower/grinder system. The system includes a suction hose that extends from the side of the vehicle and is supported by a hydraulically-assisted lift system. Vacuumed yard waste passes through the hose and into the blower/grinder where it is chopped into smaller pieces. The cut pieces are exhausted into a two-part chute and then into ducting located in the interior of the hopper. The pieces exit from the ducting into the rear compartment of the hopper. The hopper's interior ducting may be removed if it is desired to have the chopped waste enter into the forward portion of the hopper. Such a condition would be beneficial in the fall when, with the interior panel that separates the two hopper compartments removed, the entire hopper may be used for the collection of leaves.

The vehicle is also designed for the collection of branches. When accomplishing this function, a commercial chipper machine is towed behind the vehicle. The rear door of the hopper includes a secondary door through which the materials expelled from the chipper pass. The chipped materials are then received within the hopper's rear compartment.

BRIEF DESCRIPTION OF THE DRAWINGS

FIG. 2 is a front elevation view of the vehicle shown in FIG. 1. FIG. 3 is a rear elevation view of the vehicle shown in FIG. 1.

FIG. 4 is a plan view of the front portion of the vehicle shown in FIG. 1.

DETAILED DESCRIPTION OF THE DRAWINGS

Figure 1:
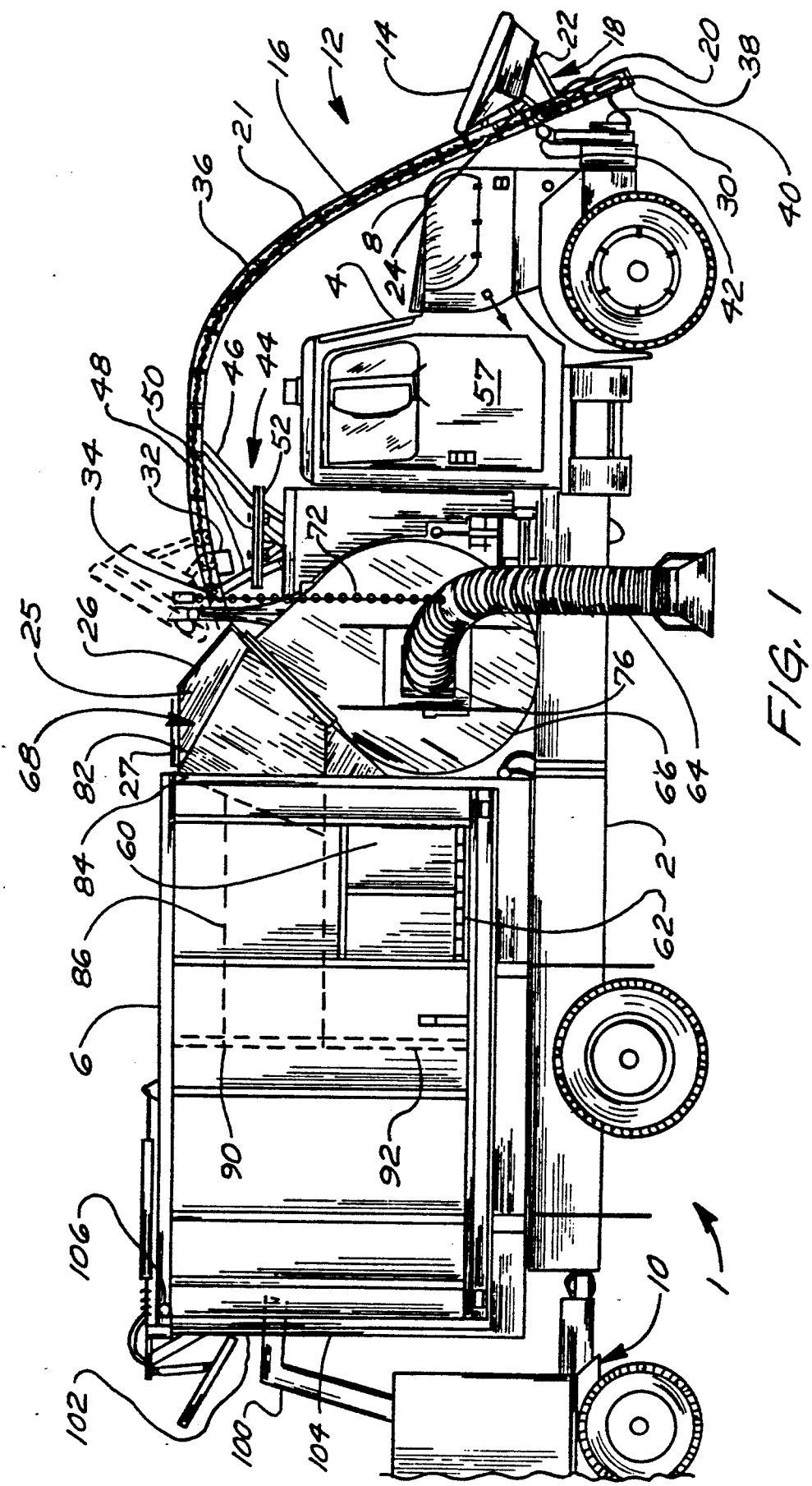
FIG. 1 is a side view of a yard waste removal vehicle in accordance with the invention.

Referring now to the drawings in greater detail, wherein like reference characters refer to like parts throughout the several figures, there is shown by the numeral 1 a yard waste removal vehicle in accordance with the invention.

The vehicle comprises a wheeled truck-type chassis 2 upon which rests a cab 4 for the vehicle's occupants and a box-like hopper 6. Forward of the cab is an engine compartment having a hood 8. The vehicle is shown towing a wood chipper machine 10.

The vehicle is adapted to collect four main types of material: bagged materials and debris; odd or large-sized debris; leaf or other loose materials; and branches. Each mode of collection will now be detailed with a discussion of the applicable structure.

To collect bagged and odd-sized yard waste, the vehicle includes a conveyer system 12. The system is located at the front of the vehicle and includes a receiver bucket 14 that is similar both in size and shape to the bucket portion of a wheel barrow. The receiver bucket is adapted to travel on track 16 through the use of a wheeled undercarriage 18.

The wheels 20 of the undercarriage are designed to roll within complementary-shaped rails 21 of the track 16. The undercarriage also includes different length supports 22 and 24 that orient the bucket at a angle relative to the track. This enables the bucket to assume a near horizontal orientation for loading (note FIG. 1) yet, when the bucket is located at the upper end of the track (shown in phantom in FIG. 1), the bucket becomes tilted so that the force of gravity causes its contents to fall into the hopper via a chute 25 having a top access opening 26. It should be noted that the bucket is preferably made of a plastic or metal material that has a smooth interior surface to facilitate the sliding of the bucket's contents during dumping.

Track 16 is arcuately shaped and extends from a point proximate the right corner of the vehicle's front bumper 30 to a point proximate the left top corner of the hopper (note FIG. 2). In this manner, the track diagonally crosses over the cab and engine compartment of the vehicle.

A hydraulic motor 32 is secured to the track proximate its top end 34 and is used to lift the bucket up the track using a chain 36. A similar motor 38 is secured to the track proximate its bottom end 40. Motor 38 is used to pull the bucket toward the bottom of the track using the same chain. Each of the motors is controlled via control levers (not shown) mounted to or proximate the vehicle's front bumper 30. It should be noted that other functionally equivalent motor/chain arrangements may be used. For example, a single motor can be used with a continuous chain that is capable of moving the bucket in both directions along the track.

As one can see in the drawings, when the bucket is located at the bottom of the track, it is located at the front of the truck proximate the truck's right side. In this location, the bucket will normally be adjacent a curb and near the ground where it can be manually loaded with bags of grass clippings or leaves or with unbagged debris. Once the user has finished loading the bucket, he or she actuates the top motor 32 which pulls the bucket to the top of the track while motor 38 freewheels. At the top of the track, the bucket automatically dumps its contents into the hopper via opening 26. A door 27 is slidably or hingedly attached to the hopper and is used to cover opening 26. It should be noted that a door to cover opening 26 is optional. After the bucket's contents have been dumped into the hopper, the operator actuates motor 38 which pulls the bucket to the bottom of the track while motor 32 freewheels.

It should be noted that other track shapes can be employed as well as other types of mechanisms to accomplish the dumping of the bucket. For example, the undercarriage 18 may include a hydraulic lift-type dumping mechanism (not shown) that can cause a dumping of the bucket.

The track is supported by a bumper-attached bracket 42 and a pivotable, "V"-shaped support structure 44 located rearwardly of the cab. As can be seen in FIGS. 1 and 4, the structure 44 comprises a front member 46, a rear member 48 and a circular base member 50. The base member is bolted onto a similarly shaped member 52 that is operatively connected to the vehicle's chassis. The attachment between members 50 and 52 is in the form of four bolts 54 arranged in a symmetrically disposed pattern about a center bolt 56.

The above noted support system for the track provides it with a unique capability. It should be noted that the conveyer system is located so that it passes over the cab and engine compartment from the right side front corner of the truck and extends diagonally rearwards. In this manner, it is conveniently located and does not obstruct the driver's vision or access to the cab's doors. However, it does fit closely over the vehicle's hood 8 and is in the way if access to the engine is required.

To enable access to the engine via the vehicle's hood 8, the track support structure allows the track to be pivoted on member 52. This is accomplished by removing the wing-bolt type quick-disconnect fasteners (not shown) that attach the track to the bumper support bracket 42. The user then removes the four bolts 54 that connect together members 50 and 52. Center bolt 56 is then loosened but left in place. To facilitate removal/-loosening of the five bolts, wing-bolt type quick-release fasteners may be employed. Once the four bolts 54 have been removed and the center bolt 56 has been loosened, the entire track system can be pivoted about the center bolt 56. In this manner, the track can be moved to a position where it traverses the top of the cab with its bottom end located adjacent the passenger's side door 57 (the alternate position of the track is shown in phantom in FIG. 4). Once so moved, full access to the hood is possible. To return the track system to its operative condition, the above steps are reversed.

To collect odd-sized or large-sized yard waste such as bundled sticks and logs, the forward portion of the hopper includes a hinged access door 60. A hydraulic assist unit (not shown) is normally employed to facilitate opening and closing of the door. The door is located to enable personnel to easily load bundled sticks, logs, etc. into the bottom of the forward portion of the hopper's interior area. As shown, the door's hinges 62 are located at the bottom of the door. When the door is opened, the hydraulic assist unit allows the door to pivot downwardly approximately ninety-degrees to facilitate loading.

To collect piles of loose yard waste such as leaves or grass clippings, the vehicle includes a vacuum system. This system is preferably powered by a small diesel engine (not shown) located behind the cab. The three main parts of the system are the suction hose 64, the grinder/blower 66 and the exhaust 68.

Suction hose 64 is preferably twelve to sixteen inches in diameter and has a length of approximately ten feet. As shown, the weight of the hose is supported by a movable boom 70 through a chain attachment 72. The boom itself can be raised or lowered by a hydraulic lift mechanism 74 that is controlled by the operator using a switch (not shown) mounted on the exterior of the hose. The end of the hose is releasably connected to the intake 76 of the blower/grinder 66. The blower/grinder includes a steel impeller (not shown) that is approximately thirty-six inches in diameter and is rotatably driven by the diesel engine to provide an output of approximately 24,000 CFM. The rotation of the impeller not only causes air to be drawn into the unit, but the blades of the impeller cut and thereby reduce the size of any leaves, twigs or grass that have been drawn into the unit.

Figure 5:
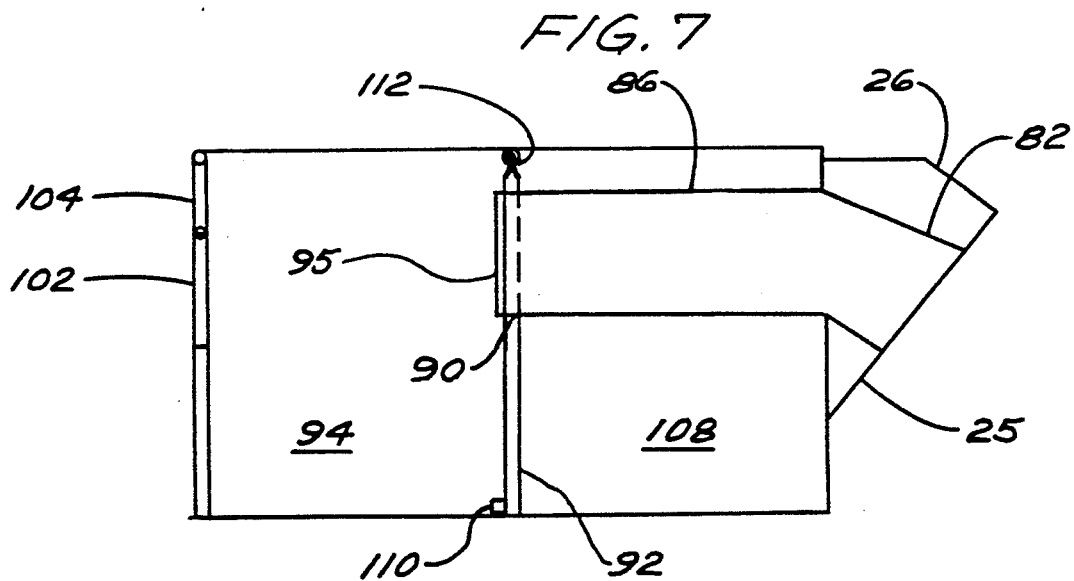
FIG. 5 is a side interior view of the hopper.

The blower/grinder exhausts the air and ground yard waste into an exhaust system 68. The exhaust system has a primary portion comprising a two-piece chute 80 and 82 with section 80 attached to the blower/grinder unit and section 82 attached to the front wall 84 of the hopper. Normally attached to chute portion 82 is a secondary portion of the exhaust system in the form of steel ducting 86 (shown in FIG. 5). Ducting 86 is located within the hopper and extends from the hopper's forward wall rearwardly to a hole 90 in interior partition 92 (note FIG. 5). In this manner, the materials exhausted from the blower/grinder are directed to a rear compartment 94 of the hopper. It should be noted that a movable plastic flap 95 is located rearwardly of hole 90 to prevent material from inadvertently entering ducting 86 from rear compartment 94.

When the vehicle is to be used for the collection of large branches, a towed chipper machine 10 is employed. The chipper is of the standard industrial type used for cutting branches into small wood chips. The chipper includes an inlet 96 and an outlet pipe 100. The pipe extends into the rear compartment 94 of the hopper through a secondary access opening 102 in the hopper's rear door 104.

The vehicle's hopper 8 is quite different from a typical vehicle-mounted hopper both in its exterior and internal structure. The exterior of the hopper includes the plurality of different access doors and openings previously mentioned. The rear door 104 of the hopper is attached to the top of the hopper by hinges 106. The hinges allow the door to pivot out of the way when the hopper is dumped (note FIGS. 6 and 7) using hydraulic lift 107. The interior of the hopper is divided by partition 92 into a forward compartment 108 and the previously noted rear compartment 94.

Partition 92 is preferably made from steel and includes the opening 90 in its upper portion through which the ducting 86 is releasably connected. By dividing the hopper into two compartments, each compartment can be used to hold different types of yard waste. In the rear compartment will be located both the chipped wood exhausted from the chipper and also the ground-up leaves and grass clippings exhausted from the blower/grinder. In this manner, the rear compartment is used to hold materials that have been processed by the blower/grinder or chipper into small-sized pieces that are ready to be directly added to a compost pile.

Located in the forward hopper compartment 108 are materials entered via the conveyer system 12 and the side access door 60. Mixed in with the organic materials are plastic bags and rope or wire used to tie the bundles of branches. In addition, large logs or oversized materials that must be reduced in size may also be located in the forward compartment. Therefore, the materials in the forward hopper compartment need to be sorted and possibly processed before the organic materials can be added to the compost piles.

Figure 6:
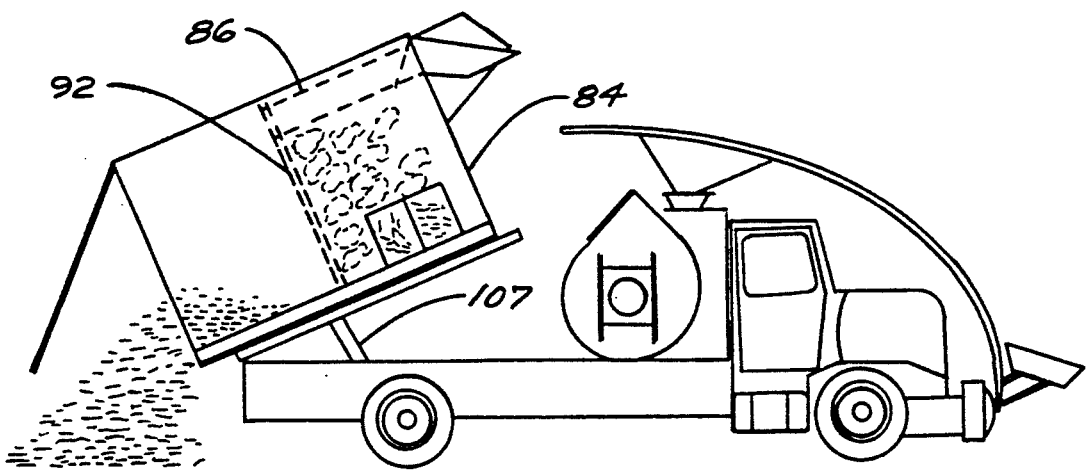
FIG. 6 is a side view of the vehicle of FIG. 1 with the chipper removed and in a first dumping mode.

When the vehicle arrives at the composting site, it would first proceed to the composting piles where it would dump the materials in the rear compartment directly onto the piles (shown in FIG. 6). The partition would prevent materials in the forward compartment from being dumped.

Figure 7:
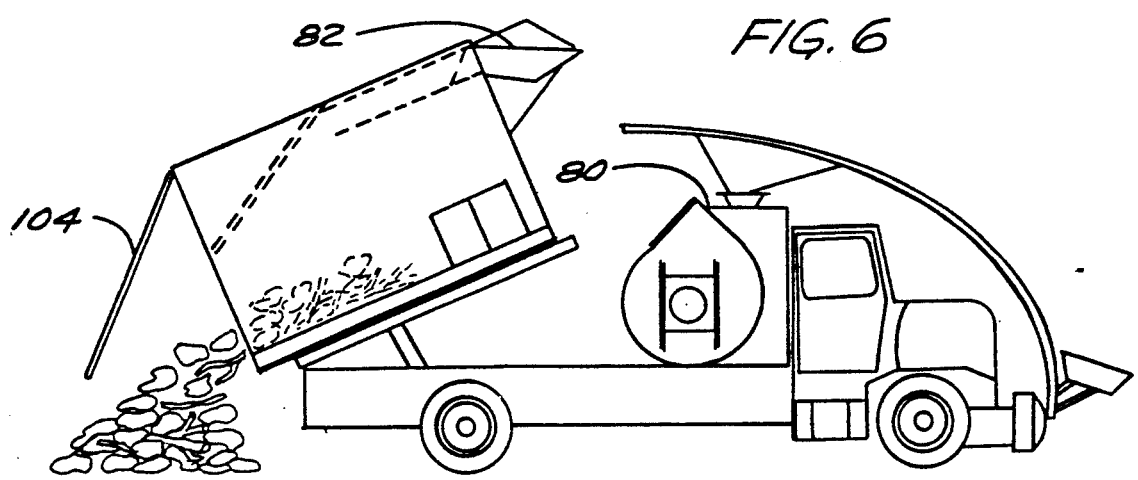
FIG. 7 is a side view of the vehicle of FIG. 1 with the chipper removed and in a second dumping mode.

The vehicle would then proceed to a second area where it dumps the materials from its forward compartment (shown in FIG. 7). In this second dumping mode, a user actuates a release mechanism 110 (not detailed) that unlocks the partition from the bottom of the hopper. Mechanism 110 will typically be in the form of a movable pin. The partition is then free to pivot on a top hinge 112 that secures the top of the partition to the top of the hopper. The forward compartment of the hopper can now be dumped as shown in FIG. 7 with the partition swinging clear on its hinge.

In the fall, the vehicle can be used solely to pick up leaves. This is accomplished by removing the partition and outlet ducting from the hopper. To facilitate this, the partition is made to be easily released from the top hinge using quick release fasteners and the ducting 86 is similarly easily detachable from the partition and from chute 82. Once the partition and interior ducting are removed, the exhausted materials from the grinder/blower can fill the entire hopper.

Another feature of the invention is that one can fully remove the conveyer system from the vehicle. Bracket 42 (located on the vehicle's front bumper) can then be used to attach a snow plow to the front of the vehicle.

The embodiment disclosed herein has been discussed for the purpose of familiarizing the reader with the novel aspects of the invention. Although a preferred embodiment of the invention has been shown and described, many changes, modifications and substitutions may be made by one having ordinary skill in the art without necessarily departing from the spirit and scope of the invention as described in the following claims.

I claim:

1. A yard waste collection vehicle comprising: a wheeled chassis having a front end and a rear end, said front end having disposed thereon a cab designed to inwardly receive at least one person;
a box-shaped hopper disposed on the rear end of said chassis, said hopper having an openable door located on a rear portion thereof, said hopper being secured to a lifting means for raising a forward end of the hopper to a raised position, said hopper having an interior area and a partition located within said interior area, said partition being movable from a first position to a second position wherein when said partition is in said first position, said partition is a means for separating the interior area of the hopper into a forward compartment and a rearward compartment, which compartments are separately enclosed from each other and wherein when said partition is in said second position, said partition does not separate the forward compartment from the rearward compartment, and a vacuum means connected to the chassis and said vacuum means having a primary duct means that connects to said hopper wherein the vacuum means is a means for vacuuming leaves from an area exterior to the vehicle and transporting said leaves into the interior area of the hopper.

2. The vehicle of claim 1 wherein said door located on the rear portion of the hopper has an opening, and the vehicle further comprises a chipper machine connected to a rear end of the vehicle, and an exhaust pipe of the chipper machine which passes from the chipper machine into the rear compartment of the hopper through said opening in the hopper's rear portion door.

3. The vehicle of claim 1 wherein the hopper has right and left sides and wherein one of said right and left sides has an opening into the interior of the hopper wherein said opening comprises means for enabling an operator to load material into the interior area of the hopper through said opening while standing alongside the hopper.

4. The vehicle of claim 3 wherein the opening located in one of said right and left sides of the hopper is located proximate the front end of the hopper wherein said means for enabling is a means for enabling an operator to load material into the forward compartment of the hopper through said opening.

5. The vehicle of claim 1 wherein a secondary ducting is located within said hopper and is operatively connected to the primary duct means and wherein said secondary ducting extends from the forward compartment of the hopper to the rearward compartment of the hopper so that said secondary ducting is a means for transporting material to the rearward compartment of the hopper.

6. The vehicle of claim 5 wherein the secondary ducting is releasably attached to the primary duct means wherein when the secondary ducting is not attached to the primary duct means, the vacuum means is a means for transporting material to the front compartment of the hopper.

7. The vehicle of claim 5 wherein the vacuum means comprises a grinder/blower located forwardly of the hopper and wherein the primary duct means is in two separable portions with one of said portions affixed to the blower/grinder and the other of said portions affixed to a front wall of the hopper wherein when the front end of the hopper is in said raised position, the two sections of the primary duct means are separated.

8. The vehicle of claim 1 further comprising a conveyer system, said system comprising:
a track located atop the cab;
a bucket movably mounted on said track for traveling from a bottom end of said track to a top end of said track,
a motor means attached to said bucket by a connecting means wherein said motor means is a means for moving the bucket on said track; and
an opening in a forward portion of said hopper proximate the top end of the track wherein when the bucket is at the top end of the track, it is proximate said opening.

9. The vehicle of claim 8 wherein the track is supported by a pedestal means, wherein the track is releasably engaged to a front portion of the chassis and to the pedestal means and wherein the pedestal means comprises means for pivoting the track on the pedestal means from a first position wherein a bottom portion of the track is located in front of said cab to a second position wherein the bottom portion of the track is located alongside the cab.

10. The vehicle of claim 8 wherein the opening in the forward portion of the hopper is located at a top of the forward compartment of the hopper wherein said opening is a means for making material dumped by said bucket into the hopper through said opening fall into the hopper's forward compartment.

11. The vehicle of claim 8 wherein the vehicle cab has a right side and a left side and wherein the track passes over the cab between the right and left sides of the cab.

12. A yard waste removal vehicle comprising:
a wheeled chassis;
an enclosed hopper disposed on top of a rear portion of said chassis, said hopper having a front end, a rear end, a right side, a left side and an interior area and wherein the rear end of said hopper includes a rear door for providing access to the hopper's interior area;
a lift mechanism attached to the chassis and the hopper, said lift mechanism is a means for tilting the hopper in a dumping manner wherein loose materials located within the interior area of said hopper are dumped out the rear door thereof;
a movable partition located within the interior area of said hopper, said partition is a means for dividing the interior area of the hopper into a forward portion and a rearward portion, which portions are separately enclosed from each other, said partition is pivotally connected to said hopper and said hopper includes a lock means for releasably engaging the partition and for preventing pivotal movement of the partition wherein when the partition is disengaged from the lock means and the hopper is tilted by the lifting mechanism, the partition pivots rearwardly and enables any loose materials located in the forward portion of the hopper's enclosed area to pass the partition and enter into the rearward portion of the hopper's interior area; and
a vacuum means having an inlet and an outlet wherein the outlet is operatively connected to the hopper wherein said vacuum means is a means for transporting any materials vacuumed into the inlet through the outlet and into the interior area of the hopper.

13. The vehicle of claim 12 further comprising a conveyer system that includes a bucket movably mounted on a track wherein said track is oriented wherein a bottom end of said track is located in front of the front end of the hopper and wherein a rear end of the track is located proximate an opening in a top portion of the front end of the hopper.

14. The vehicle of claim 13 further comprising an access door in at least one of said right and left sides of the hopper and said access door is a means through which a person can place material into the interior area of the hopper.

15. The vehicle of claim 14 further comprising a chipping machine attached to a rear end of the chassis, said chipping machine having a material exhaust pipe that passes through an opening in the hopper's rear door, said exhaust pipe is a means for exhausting material chipped by the chipping machine into the hopper's interior area.

16. A yard waste collection vehicle comprising:
   a wheeled chassis having a front end and a rear end, said front end having disposed thereon a cab designed to inwardly receive at least one person;
   a box-shaped hopper disposed on the rear end of said chassis, said hopper having an openable door located on a rear portion thereof, said hopper being secured to a lifting means for raising a forward end of the hopper, said hopper having an interior area and a partition located within said interior area, said partition being movable from a first position to a second position wherein when said partition is in said first position, said partition is a means for separating the interior area of the hopper into a forward compartment and a rearward compartment, and wherein when said partition is in its second position, it no longer separates the forward compartment from the rearward compartment, and a conveyer system that includes a bucket movably mounted on a track wherein a top portion of the track is located proximate an opening in a top portion of the hopper and the track is pivotally supported by a pedestal means.

17. The vehicle of claim 16 wherein the track is releasably engaged to an extreme front portion of the chassis whereby when the track is not engaged to the extreme front portion of the chassis, the track can be pivoted on the pedestal means from a first position wherein a bottom portion of the track is located in front of said cab to a second position wherein the bottom portion of the track is located alongside the cab.

18. The vehicle of claim 16 wherein the vehicle's cab has a right side and a left side and wherein the track has an arcuate shape and passes over the cab between the right and left sides of the cab.

19. The vehicle of claim 16 further comprising a vacuum means having an inlet and an outlet wherein the outlet is operatively connected to the hopper wherein said vacuum means is a means for transporting any materials vacuumed into the inlet through the outlet and into the interior area of the hopper.

20. The vehicle of claim 16 wherein the partition located in the interior area of the hopper is removable.

21. A yard waste collection vehicle comprising:
   a wheeled chassis having a front end and a rear end, said front end having disposed thereon a cab designed to inwardly receive at least one person;
   a box-shaped hopper disposed on the rear end of said chassis, said hopper having an openable door located on a rear portion thereof, said hopper being secured to a lifting means for raising a forward end of the hopper, said hopper having an interior area and a partition located within said interior area, said partition being movable from a first position to a second position wherein when said partition is in said first position, said partition is a means for separating the interior area of the hopper into a forward compartment and a rearward compartment, and wherein when said partition is in its second position, it no longer separates the forward compartment from the rearward compartment, and a conveyer system that includes a bucket movably mounted on a track wherein a top portion of the track is located proximate an opening in a top portion of the hopper and said track extends over the vehicle's cab.

22. The vehicle of claim 21 wherein said track is oriented wherein a bottom end of said track is located in front of the cab and wherein the opening in the top portion of the hopper that is proximate the top portion of the track is located at a top of the forward compartment of the hopper wherein said opening is a means for making material dumped into the hopper through said opening fall into the hopper's forward compartment.

23. The vehicle of claim 21 further comprising a vacuum means having an inlet and an outlet wherein the outlet is operatively connected to the hopper wherein said vacuum means is a means for transporting any materials vacuumed into the inlet through the outlet and into the interior area of the hopper.

* * * * *